Oct. 16, 1928.
G. W. TRASK
1,687,956
MILK BOTTLE INDICATOR AND COIN HOLDER
Filed April 5, 1928
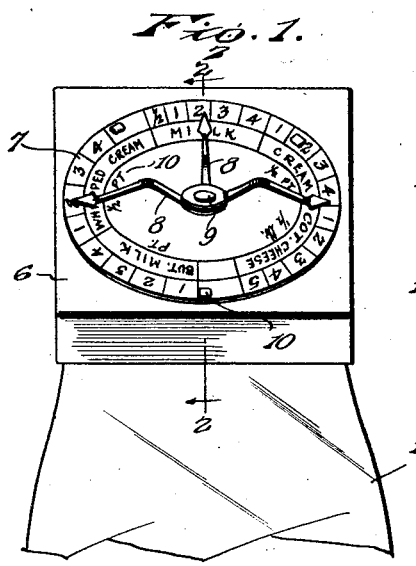
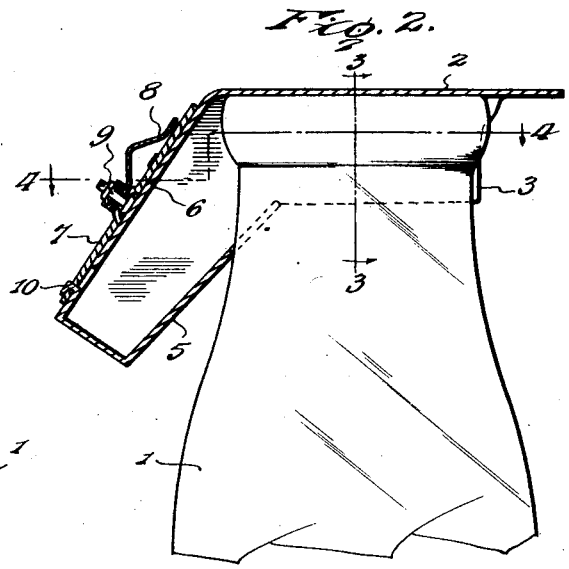
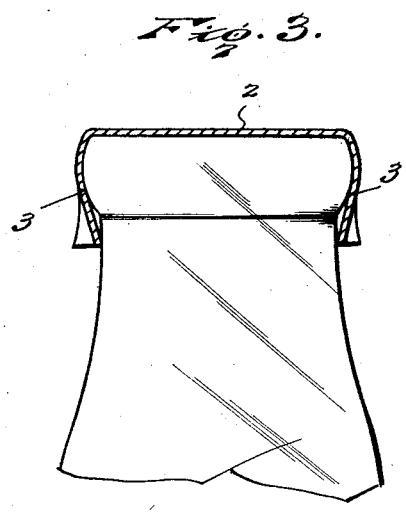
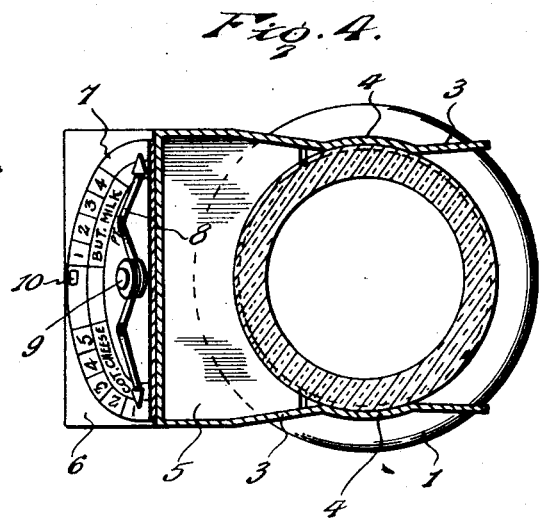
Inventor
G. W. Trask.
By Lacey & Lacey, Attorneys Patented Oct. 16, 1928.

1,687,956

UNITED STATES PATENT OFFICE.

GLENN W. TRASK, OF GREEN BAY, WISCONSIN.

MILK-BOTTLE INDICATOR AND COIN HOLDER.

Application filed April 5, 1928. Serial No. 267,678.

The practice of placing notes and coin in milk bottles by the housewife to advise the milkman or trademan of needs is not generally satisfactory, chiefly because of weather conditions, and to meet this situation and obviate the objectionable features is the purpose of this invention.

The invention provides a combined cover for the milk bottle, holder for coin and indicator for the goods desired, the device being readily attachable to and detachable from the milk bottle and positively retained in place when applied to the bottle.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a front view of a combined indicator and holder embodying the invention, and showing it applied to the upper portion of a milk bottle.

Figure 2 is a detail sectional view on the line 2—2 of Figure 1.

Figure 3 is a detail sectional view on the line 3—3 of Figure 2, looking towards the rear as designated by the arrows.

Figure 4 is a horizontal sectional view on the line 4—4 of Figure 2.

Corresponding and like parts are referred to in the following description and designated in the several views of the drawing by like reference characters.

The numeral 1 denotes a milk bottle, such as universally used for the handling of milk. The device is constructed to form a cover for the bottle and to clamp the mouth portion thereof, and includes a holder for receiving coin, a note or other article, which it may be desired to deliver to the tradesman. The device is preferably constructed of sheet metal and comprises a bottle engaging portion and a holder to which is applied indicating means including a dial and hands.

The bottle engaging portion includes a top 2, and sides 3, the top 2 being flat and of an extent to project over the mouth of the bottle. The sides 3 are downwardly converged, as indicated most clearly in Figure 3 of the drawings so as to embrace the bead formed at the mouth or upper end of the bottle, and retain the device in position against casual displacement. The end portions of the sides 3 flare slightly, as shown most clearly in Figure 4 of the drawings, thereby facilitating the placing of the device in position upon the bottle. The sides 3 are further pressed outwardly intermediate their ends, as indicated most clearly in Figure 4 of the drawings to prevent accidental disengagement of the device from the bottle when properly applied thereto.

The device is placed upon the bottle or removed therefrom by a sliding movement, the sides 3 yielding laterally to permit clearing opposite side portions of the bead or bulge at the mouth of the bottle.

The holder is inclined to the bottle engaging portion so as to extend downwardly along a side of the milk bottle when the device is positioned thereon, as indicated most clearly in Figure 2 of the drawings. The holder is hollow and constitutes a receptacle for the reception of coin or other articles to be deposited therein as a means of communication between the housewife and tradesman. The holder includes a bottom 5 and a top 6, the upper rear edge of the bottom 5 being cut away to snugly fit a side of the milk bottle, as indicated most clearly in Figure 4 of the drawings. The top 6 forms a continuation of the top 2 and the sides of the holder form extensions of the sides 3. The upper open end of the holder is closed by the neck portion of the bottle 1 when the device is in position thereon. The construction is such as to preclude sleet, snow and rain from entering the holder or reaching the mouth of the milk bottle.

The indicator includes a dial 7 and a plurality of hands 8 mounted upon a stud 9 which is secured to the dial. The hands 8 are deflected outwardly intermediate their ends to provide gripping portions for the hand to take hold of when moving the hands to the required adjusted positions.

The dial is provided with indications to designate the article and the amount, such as the different grades of milk and cream, cheese and other products or goods handled by the tradesman. The dial 7 is separate from the holder and adapted to be applied to the top or front thereof. This arrangement provides for ready replacement of broken hands or the substitution of different dials to meet varying requirements. Tongues 10 are partly cut from the top or front portion of the holder and are adapted to pass through openings formed in the dial, the projecting ends being clinched, as indicated most clearly in Figure 2 of the drawings to retain the dial in place and admit of ready detachment thereof when required.

In practice the device is adapted to be applied to the mouth portion of a milk bottle which is subsequently placed in position for collection by the tradesman. In the event of the housewife desiring an article the hand is adjusted to designate the article and the amount and the cost of the same may be placed within the holder. Obviously, the arrangement admits of a note or other article to be delivered being placed within the holder to be taken up by the tradesman. In this manner communication may be had between the customer and the tradesman, irrespective of weather conditions which would not be practical in the usual way of placing notes in empty bottles or in boxes arranged to receive the bottles to be returned or delivered.

Having thus described the invention, I claim:

1. A device of the character specified comprising a bottle engaging portion including a top and sides, the latter being downwardly converged from the top and having an intermediate portion pressed outwardly to engage the mouth portion of a milk bottle at diametrically opposite points.

2. A device of the character specified comprising a bottle engaging portion and an article holder inclined forwardly and downwardly from the bottle engaging portion and adapted to be closed at its upper open end by a side of the bottle when the device is positioned thereon.

3. Indicating means including a dial and a cooperating hand having an intermediate portion deflected outwardly from the dial to provide a finger grip.

4. A device of the character specified comprising a bottle engaging portion, a holder inclined outwardly and downwardly from the bottle engaging portion, indications on the front portion of the holder and hands pivoted upon the holder and adapted to coact with the indications and having an intermediate portion deflected outwardly from the holder to provide a finger grip.

5. A device of the character specified comprising a bottle engaging portion, a holder having portions partly cut therefrom to provide tongues, a dial having openings to receive the said tongues, the projecting ends of which are clinched to retain the dial in place and hands pivoted to the dial and adapted to cooperate with the indications thereon.

6. A device of the character specified comprising a bottle engaging portion including a top and sides, the latter converging downwardly and having intermediate portions pressed outwardly, a holder at the forward end of the bottle engaging portion inclining outwardly and downwardly therefrom and adapted to have its upper end closed by a side of the bottle, a dial detachably connected with the holder and hands carried by the dial and adapted to cooperate with the indications thereon.

In testimony whereof I affix my signature.

GLENN W. TRASK. [L. S.]